United States Patent
Koehler et al.

(10) Patent No.: US 7,294,084 B2
(45) Date of Patent: Nov. 13, 2007

(54) TRANSVERSE DIFFERENTIAL OF A MOTOR VEHICLE AND METHOD FOR PRODUCTION THEREOF

(75) Inventors: Thomas Koehler, Hessisch-Lichtenau (DE); Guenter Niebauer, Hochdorf (DE); Rudolf Paasch, Filderstadt (DE); Albert Topp, Hofgeismar (DE)

(73) Assignee: DaimlerChrysler AG, Stuttgart (DE)

( * ) Notice: Subject to any disclaimer, the term of this patent is extended or adjusted under 35 U.S.C. 154(b) by 188 days.

(21) Appl. No.: 11/220,576

(22) Filed: Sep. 8, 2005

(65) Prior Publication Data
US 2006/0073930 A1    Apr. 6, 2006

(30) Foreign Application Priority Data
Sep. 8, 2004   (DE) .................. 10 2004 043 337

(51) Int. Cl.
*F16H 48/06*   (2006.01)

(52) U.S. Cl. ..................................... 475/230

(58) Field of Classification Search ................ 475/230, 475/246, 247
See application file for complete search history.

(56) References Cited

U.S. PATENT DOCUMENTS
2,786,367 A * 3/1957 Rockwell .................... 475/246

FOREIGN PATENT DOCUMENTS
DE    102 38 236    3/2004

* cited by examiner

*Primary Examiner*—Dirk Wright
(74) *Attorney, Agent, or Firm*—Crowell & Moring LLP

(57) ABSTRACT

A transverse differential and a welding method for its producing, in which a differential bolt and a differential case are fixedly connected to one movement-wise. For this purpose, a bolt/case welding is produced in which, material of a differential bolt is fused and is transported or entrained into the preferably likewise fused material of the differential case, and fused entrained material of a differential bolt is solidified in the region of the differential case.

13 Claims, 2 Drawing Sheets

TRANSVERSE DIFFERENTIAL OF A MOTOR VEHICLE AND METHOD FOR PRODUCTION THEREOF

BACKGROUND OF THE INVENTION

The present invention relates to a motor vehicle transverse differential in which a differential bolt and case are fixedly connected to each other movement-wise and to a corresponding production method therefore.

DE 10238236 A1 discloses a transverse differential whose differential case is manufactured from a cost-effective material, such as, for example, GGG—i.e., cast iron with spheroidal graphite or globular grey cast iron, and consists of at least two differential-case parts. By contrast, the crown wheel consists of a high-quality and therefore costly material of, for example, a hardened steel. This ensures, for the hypoid toothing on the crown-wheel/pinion pairing, a high wear resistance, high fail-safety and, since the tooth engagement geometry therefore scarcely changes over time, also, in the long term, a high efficiency and a high degree of quiet running. The connection between the one differential-case part and the crown wheel is made by a laser weld, and the differential bolt of the transverse differential is secured both axially and radially by grooved pins. These measures reduce the production costs for a transverse differential of this type.

SUMMARY OF THE INVENTION

An object of the present invention is to substantially reduce the costs for producing a transverse differential while retaining at least an equal quality.

This and other objects have been achieved by producing a transverse differential where at least in the region of a common connection, material of the differential bolt differs from the material of the differential case, and in that fused material of the differential bolt is entrained into the material of the differential case.

By fusion and subsequent entrainment, and also by subsequent solidification of entrained material of a differential bolt in the region of the differential case, a simple and cost-effective way is achieved to have an intended rigid, twist-proof and axially fixed connection between a differential bolt and a differential case.

Furthermore, due to the use of different materials, the material costs are lowered, in particular by using a laser-welding method highly suitable for the connection of different materials.

In the laser-beam welding method, a laser beam is focused onto a laser focus, inter alia, by lenses via a laser-beam cone. Within the scope permitted by the angle of the laser-beam cone, a good machineability of locations where access is difficult is achievable as compared with other welding methods. In particular, good access to weld seams is attainable in a simple manner, even in the case of a laser-beam cone of 15°.

A further advantage of laser welding is that the construction space to be reserved for the transverse differential can be small. That is, because of the high power density, the laser-welding method produces particularly narrow weld seams with a narrow heat influence zone in the weld seam. Also, in laser welding, the material properties are advantageously modified only insignificantly.

The machining quality in laser welding is highly reproducible, so that even stringent quality requirements are fulfilled.

The need for remachining in laser welding is advantageously low.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

The following directional indications, (namely, front, rear, left, right) refer to the direction of travel.

Figure 1:
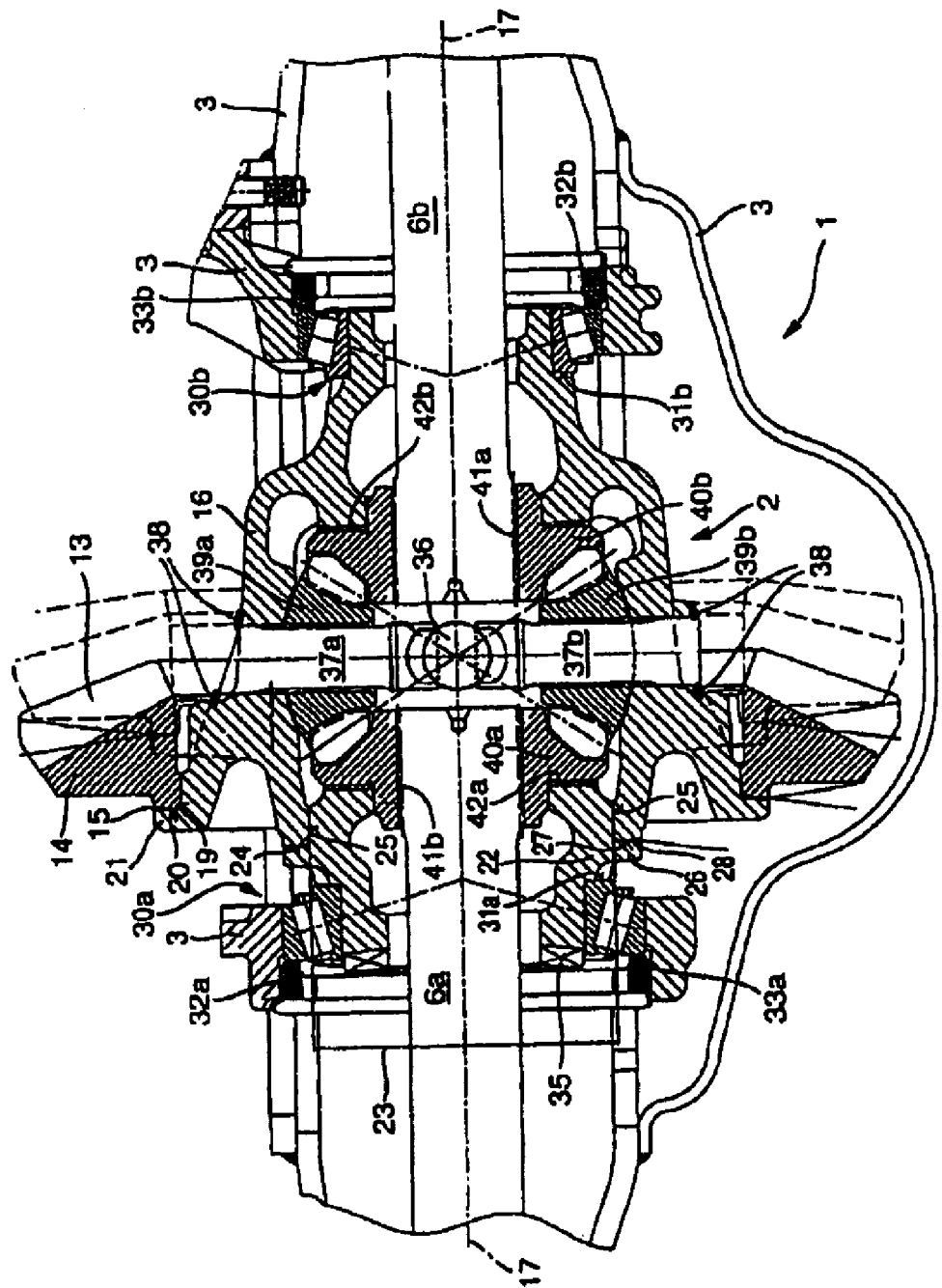
FIG. 1 is a partial cross-sectional view of a rear-axle transmission for a commercial vehicle.

FIG. 1 illustrates a rear-axle transmission 1. The rear-axle transmission case 3 encloses, among other things it, a drive pinion (not illustrated in detail), and a transverse differential 2 with two wheel-drive half-shafts 6a, 6b.

The drive pinion is rotatably mounted at the front in the rear-axle transmission case 3 and is arranged perpendicularly to a rotation axis 17 of the transverse differential 2. A bevel wheel arranged at that end of the drive pinion which is inside the case, i.e., at the rear, has a toothing which engages into a hypoid toothing 13 of a crown-wheel rim 14 consisting of the chromium/molybdenum hardened steel 25 MoCr 4E. This crown-wheel rim 14 is laser-welded on its left-hand side, by a weld seam 15, to a differential case of the transverse differential 2. The differential case is made as a grey-iron differential cage 16, for example, a cast iron with spheroidal graphite.

Sometime prior to the laser welding operation, the basic form of the crown-wheel rim 14 is forged and the hypoid toothing 13 is milled and ground. The crown-wheel rim 14 has, between its centric bore and a left-hand end face, a chamfer 19 for the assembly-easy attachment of the toothed rim 14 onto a lathe-machined surface of the grey-iron differential cage 16. After being attached, the crown-wheel rim 14 comes with its machined end face 20 to bear against a radially projecting collar 21 of the grey-iron differential cage 16. The weld seam 15 is arranged radially on the outside at the abutting face between the end face 20 of the crown-wheel rim 14 and the collar 21, and is produced as a result of the thermal influence of a laser beam introduced radially from outside after the assembly of the grey-iron differential cage 16, the crown-wheel rim 14, a grey-iron cover 22 and further internal parts explained below.

To produce the differential case of the transverse differential 2, the grey-iron differential cage 16 is advantageously laser-welded to the grey-iron cover 22. For this purpose, the grey-iron differential cage 16 has, between its centric bore 23 and a left-hand end face 24, a chamfer 25 for the assembly-easy insertion of the grey-iron cover 22. The lathe-machined surface area 25, matching with the bore 23, of the grey-iron cover 22 has a transition fit with the grey-iron differential cage 16. After the insertion of the grey-iron cover 22, the grey-iron cover 22 comes with a radially projecting collar 26 to bear against the end face 27 of the grey-iron differential cage 16. The weld seam 28 is arranged radially on the outside at the abutting face between the end face 27 and the collar 26. This weld seam 28 has been produced as a result of the thermal influence of a laser beam introduced radially from outside after the assembly of the grey-iron differential cage 16, the crown-wheel rim 14, the grey-iron cover 22 and the internal parts explained further below. The two weld seams 15, 28 are thus arranged concentrically to one another or to the rotation axis 17.

The transverse differential 2 is mounted in the rear-axle transmission case 3 rotatably and axially non-displaceably with respect to the rotation axis 17. For this purpose, the transverse differential 2 is mounted in an arrangement in the rear-axle transmission case 3 by two tapered roller bearings 30a, 30b. The grey-iron cover 22 is associated with the left-hand tapered roller bearing 30a, and the grey-iron differential cage 16 is associated with the right-hand tapered roller bearing 30b. The bearing inner rings of the tapered roller bearings 30a, 30b are supported with their end faces 31a, 31b facing one another on shoulders of the grey-iron cover 22 and of the grey-iron differential cage 16. The necessary bearing setting or prestress is achieved by externally threaded rings 32a, 32b which press against those end faces 33a and 33b of the bearing outer rings of the tapered roller bearings 30a and 30b which face away from one another. To establish the bearing setting, the externally threaded rings 32a, 32b oriented coaxially to the rotation axis 17 are screwed in a solid cast-iron region of the rear-axle transmission case 3.

The grey-iron cover 22 laser-welded to the grey-iron differential cage 16 has clutch dogs 35 in the exit region of the left-hand wheel-drive half-shaft 6a. These clutch dogs 35 form one clutch half of a positive differential lock (not illustrated detail, such as is described in DE 199 50 171 A1. The clutch dogs 35 are locally case-hardened inductively in a known manner.

The differential cage 16 has incorporated in it four bores which are arranged on the circumference so as to be offset in each case at 90° to one another and in which a differential cross is supported in the circumferential direction with respect to the axis of rotation 17. This differential cross comprises a long differential bolt 36, into which two short differential bolts 37a, 37b are inserted perpendicularly. Arranged radially outside the differential cross are bolt/case welds 38 which extend at least from the edge region of the respective end face of the respective differential bolt 36, 37a and 37b into the respectively adjacent region of the grey-iron differential cage 16. As a result, the differential bolts 36, 37a, 37b are held fixedly in rotational terms with respect to the differential cage 16 of the differential case. Furthermore, as a result of this measure, the differential bolts 36, 37a, 37b are also reliably supported radially outwards even in the case of high rotational speeds of the transverse differential 2.

Because laser beams are already used for producing the differential case in accordance with the invention, the introduction of the bolt/case welds 38 may likewise advantageously take place by laser welding in the same plant, thereby utilizing the plant more efficiently and reducing the production costs even further.

Moreover, in a similar way to the crown-wheel rim 14, a higher quality material than the differential case material may be used for the differential bolt or differential cross material. To implement a high-quality rotational and axial securing of the differential bolts 36, 37a, 37b, previously fused material of the differential bolts 36, 37a, 37b is entrained into the likewise fused material of the differential case and jointly solidified.

Figure 2:
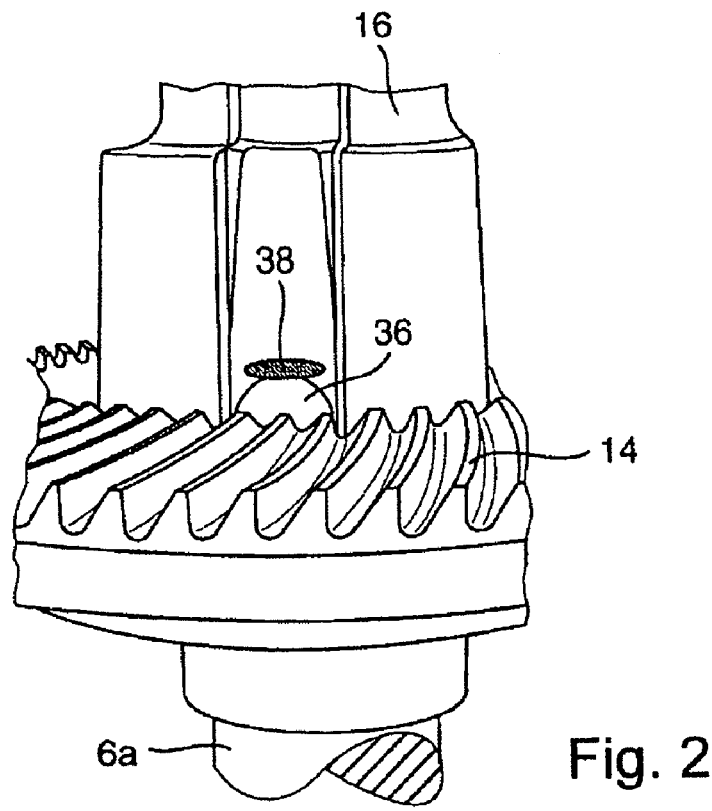
FIG. 2 is a partial cross-sectional view of an enlarged portion of bolt/case welds running parallel to the tangential direction.
Figure 3:
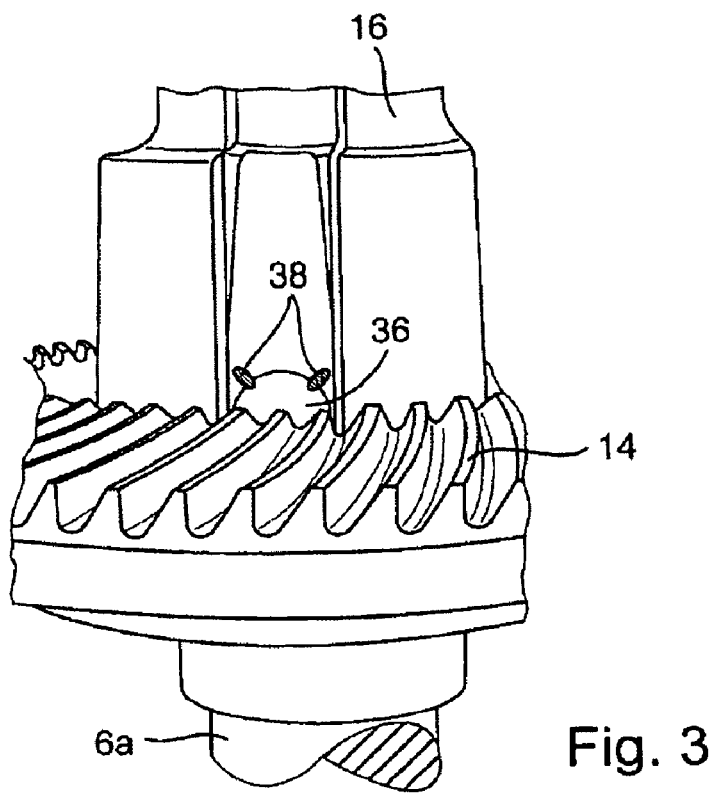
FIG. 3 is a partial, isolated enlarged view showing bolt/case welds running radially.

The bolt/case weld seam or seams 38 of the bolt/case welding are preferably oriented parallel to a tangential of the differential bolt 36, 37a, 37b (FIG. 2) and/or in the radial direction of the differential bolt 36, 37a, 37b (FIG. 3). In this illustrated region, the components are, at least temporarily, easily accessible, with the result that the bolt/case weld seam or seams 38, of the bolt/case welding can be simply produced according to the invention.

In the case of tangential orientation of the bolt/case weld seam or seams 38 of the bolt/case welding, the fusion of the material may be started even in the region of the differential case if, at least on the opposite side of the weld seam, material of the differential bolt 36, 37a, 37b is transported or entrained into the region of the differential case and solidified there.

As the material of the differential bolt 36, 37a, 37b, preferably an easily weldable material, (more preferably an iron alloy, particularly preferably a steel, in particular 31 Cr Mo V 9) is selected, it can easily be fused and easily entrain the fused material.

Instead or in addition to the chromium/molybdenum hardened steel already mentioned, other weldable hardened steels may also be used within the scope of the invention. In particular, the laser-weldable hardened steels 20 MnCr 5 E, 20 NiMo Cr 6 E, 18 CrNi 8 and 18 NiCr 5 have proved to be advantageous.

As the material of the differential case, a poorly weldable crack-susceptible material (preferably a cast metal, particularly preferably a grey iron or grey cast iron, in particular GJS 600) is selected, because this is at least highly cost-effective. Moreover, the differential case can thus be produced as a dead-mold casting simply and cheaply.

Coaxially to the three differential bolts 36, 37a, 37b, four differential wheels 39a, 39b are arranged rotatably with respect thereto, only two of the said differential wheels being shown in the drawing plane.

These differential wheels 39a, 39b, supported radially outwards with respect to the axis of rotation 17, have toothings which engage in the conventional way into toothings of two drive bevel wheels 40a, 40b. These drive bevel wheels 40a, 40b are arranged coaxially to the rotation axis 17 and are connected fixedly to rotation in each case to one of the two wheel-drive half-shafts 6a, 6b by shaft/hub toothings 41a, 41b. The drive bevel wheels 40a, 40b are supported outwards with high axial forces as a result of the forces at the bevel-wheel toothings. These axial forces are absorbed on the right-hand side by the grey-iron differential cage 16 and on the left-hand side by the grey-iron cover 22. Spacer washers 42a, 42b are inserted between the bearing faces, facing away from one other, of the drive bevel wheels 40a, 40b and the bearing faces of the grey-iron differential cage 16/grey-iron cover 22.

To install the internal parts of the transverse differential, (i.e., the spacer washers 41a and 41b, the four differential wheels 39a, 39b and the two drive bevel wheels 40a, 40b), the bore 23 of the grey-iron differential cage 16 has a larger diameter than each diameter of the aforementioned internal parts. Consequently, the internal parts can be inserted without difficulty through the bore 23, before the grey-iron cover 22 is subsequently fitted in and the two weld seams are produced.

The concentric arrangement of the two weld seams achieves welding of the internal components, crown-wheel rim 14/grey-iron differential cage 16/grey-iron cover 22, in one operation. In this case, the transverse differential 2 assembled with all its internal parts is chucked in a laser-welding machine in which the transverse differential 2 rotates about the rotation axis 17. In the subsequent laser-beam welding method, a laser beam is divided by optical lenses, and/or mirrors, and/or prisms and/or windows and/or dividers into two laser-beam cones with two laser foci, each of the two laser foci being directed in each case onto one of the two abutting faces to be welded. Both weld seams can thus be produced in one work step while the case/crown-wheel rim is rotating.

Beforehand, during this welding operation or thereafter, the production of the bolt/case weld seam or seams 38 of the bolt/case welding can be carried out.

In an alternative arrangement for welding the two weld seams, the transverse differential, likewise assembled with all its internal parts, is chucked in a welding machine in which the transverse differential rotates about its rotation axis. In this alternative embodiment, however, two laser foci already separated in emission are directed onto the transverse differential, each abutting face being assigned a laser focus.

The two welded joints may also be produced successively in time. The introduction of heat, as seen over a defined period of time, can thereby be reduced.

One or both of the laser foci may also rotate about the transverse differential in order to carry out the welding. In this case, the laser foci can be guided by known transmitting or reflecting optics. The laser emitter may also be fastened on a ring arranged concentrically to the transverse differential.

The laser weld may also be an interrupted seam in order to reduce the introduction of heat or to reduce the distortion or to accelerate the operation.

Depending on the welding method, the regions in which the weld seam is produced do not have to be abutting faces. Thus, profiles may also be provided, by way of which a positive connection is made. A plurality of shoulders may also be provided.

The laser beams are generated by an emitter which is, for example, a gas laser, such as, for example, a carbon dioxide laser or an excimer laser. Furthermore, the emitter may be a solid-state laser, such as, for example, a neodymium/yttrium/aluminium/garnet laser.

The transverse differential shown in the illustration embodiment is, with the exception of the crown-wheel rim and of the differential lock, essentially symmetrical with respect to a mid-plane in which the differential cross lies. It is therefore also contemplated to arrange the cover of the transverse differential on the right-hand side and the differential cage on the left-hand side.

Other weldable cast-iron metals, such as, for example, cast iron with graphite flakes, may also be used as material for the grey-iron differential cage, without the cost benefit being lost.

In addition to the inductive hardening, shown in the illustrated embodiment, of the clutch dogs consisting of a cast iron with spheroidal graphite, a cast iron with graphite flakes may also be provided with inductively hardened clutch dogs.

The differential case cover, carrying inductively case-hardened clutch dogs, may also consist of low-alloyed forged steel instead of cast iron. This forged steel is likewise appropriate for the inductive case-hardening. Such a low-alloyed forged steel is, for example, C15 or C45. Depending on the choice of material, the size of the cover and the size of the region to be hardened, inductive case-hardening may be the more advantageous method in one instance and hardening in another instance.

In addition to a hypoid toothing on the crown-wheel/pinion pairing, particularly in the case of off-road commercial vehicles, the use of a straightforward simple bevel toothing which, however, is advantageous in terms of efficiency is also contemplated.

In addition to the tangentially and radially oriented bolt/case welds explained, combinations of these are, of course, also contemplated, in which case the respective bolt/case welds do not have to be continuous, but need be present only in the region of transition between differential bolts 36, 37*a*, 37*b* and differential case.

The foregoing disclosure has been set forth merely to illustrate the invention and is not intended to be limiting. Since modifications of the disclosed embodiments incorporating the spirit and the substance of the invention may occur to persons skilled in the art, the invention should be construed to include everything within the scope of the appended claims and equivalents thereof.

The invention claimed is:

1. Transverse differential adapted for use in a motor vehicle, comprising a differential bolt, and a differential case operatively and fixedly connected movement-wise to the differential bolt, wherein at least one bolt/case weld seam of a bolt/case welding is oriented at least one of parallel to a tangential of the differential bolt and in a radial direction of the differential bolt, and at least in the region of a common connection therebetween, material of the differential bolt differs from material of the differential case, and fused material of the differential bolt is carried over in only one direction and is entrained into the material of the differential case during production.

2. Transverse differential according to claim 1, wherein a bolt/case welding is arranged in a region of a differential bolt end face.

3. Transverse differential according to claim 1, wherein the differential bolt material is selected to be an easily weldable material.

4. Transverse differential according to claim 3, wherein the differential bolt material is an iron alloy, particularly preferably a steel, including 31 Cr Mo V 9.

5. Transverse differential according to claim 1, wherein bolt/case welding has at least one laser-welded bolt/case weld seam.

6. Transverse differential according to claim 1, wherein the differential case has at least one grey-iron differential cage and a grey-iron cover consisting of case iron.

7. Transverse differential according to claim 6, wherein the differential cage and grey-iron cover are laser-welded together.

8. Method for producing the transverse differential of claim 1, comprising producing a bolt/case welding by fusing material of a differential bolt and transporting or entraining the fused matter into a fused material of the differential case, and solidifying fused entrained material of the differential bolt in a region of the differential case.

9. Method according to claim 8, wherein the material of the differential bolt is fused and entrained in its end face region.

10. Method according to claim 8, wherein material for the differential bolt is selected to be an easily weldable material.

11. Method according to claim 10, wherein the differential bolt material is an iron alloy, particularly preferably a steel, including 31 Cr Mo V 9 and as material for the differential case is selected to be a poorly weldable crack-susceptible material.

12. Method according to claim 10, wherein the differential case material is a case metal, particularly preferably a grey iron or grey cast iron including GJS 600.

13. Method according to claim 8, wherein material of the differential bolt is laser fused.

* * * * *